(12) United States Patent
Lange

(10) Patent No.: US 10,860,041 B2
(45) Date of Patent: Dec. 8, 2020

(54) THERMOSTAT MIXING VALVE

(71) Applicant: Fluehs Drehtechnik GmbH, Luedenscheid (DE)

(72) Inventor: Lutz Lange, Luedenscheid (DE)

(73) Assignee: Fluehs Drehtechnik GmbH, Luedenscheid (DE)

( * ) Notice: Subject to any disclaimer, the term of this patent is extended or adjusted under 35 U.S.C. 154(b) by 87 days.

(21) Appl. No.: 16/302,821

(22) PCT Filed: Jan. 24, 2018

(86) PCT No.: PCT/EP2018/051749
§ 371 (c)(1),
(2) Date: Nov. 19, 2018

(87) PCT Pub. No.: WO2018/145905
PCT Pub. Date: Aug. 16, 2018

(65) Prior Publication Data
US 2019/0204858 A1 Jul. 4, 2019

(30) Foreign Application Priority Data
Feb. 13, 2017 (DE) .................... 20 2017 100 756 U

(51) Int. Cl.
*G05D 23/13* (2006.01)
*E03C 1/04* (2006.01)
(Continued)

(52) U.S. Cl.
CPC ......... *G05D 23/1353* (2013.01); *E03C 1/041* (2013.01); *F16K 11/04* (2013.01); *F16K 31/002* (2013.01); *G05D 23/1346* (2013.01)

(58) Field of Classification Search
CPC ............ G05D 23/1353; G05D 23/1346; F16K 31/002; F16K 11/04
See application file for complete search history.

(56) References Cited

U.S. PATENT DOCUMENTS 5,340,018 A * 8/1994 MacDonald ....... G05D 23/1353
  236/12.2
7,344,088 B2 * 3/2008 Yang .................... G05D 23/136
  236/12.2
(Continued)

FOREIGN PATENT DOCUMENTS

DE        102 02 560 A1    8/2003
DE    10 2007 055455 A1    5/2009
(Continued)

OTHER PUBLICATIONS

International Search Report of PCT/EP2018/051749, dated May 18, 2018.

*Primary Examiner* — Kun Kai Ma
(74) *Attorney, Agent, or Firm* — Collard & Roe, P.C.

(57) ABSTRACT

Thermostatic mixing valve for sanitary fittings, with a top piece, in which a cone is disposed to be axially movable via a rotatably mounted spindle, and a passage sleeve with windows for the supply of hot and cold water, in which a carriage preloaded via a spring and joined to a thermoelement provided with a control piston is axially movable, wherein the supply of hot and cold water through the windows can be regulated in dependence on the movement of the carriage, wherein the cone (5) comprises a bushing (51), which at its underside turned away from the spindle (2) is closed via a bottom and in which a conical piston (53) is disposed to be axially movable and is preloaded via a spring (54) in the direction of the bottom, wherein a coupling duct is disposed in the bottom in axially aligned manner with the conical piston (53) and which at the same time is axially aligned with the control piston (81) of the thermoelement, and into which the conical piston (53) and/or the control piston (81) of the thermoelement (8) can be moved, and wherein, in an upper position of the carriage (7) (hot-water position), the control piston (81) bears on the conical piston (Continued)

(53) and the bottom is spaced apart from the carriage (7) and, in a lower position of the carriage (7) (cold-water position), the control piston (81) is spaced apart from the conical piston (53) and the bottom rests on the carriage (7).

16 Claims, 12 Drawing Sheets

(51) Int. Cl.
    *F16K 11/04*     (2006.01)
    *F16K 31/00*     (2006.01)

(56) References Cited

U.S. PATENT DOCUMENTS

| | | | | |
|---|---|---|---|---|
| 7,770,808 B2 * | 8/2010 | Ruga | ................ | G05D 23/1353 236/12.2 |
| 7,913,926 B2 * | 3/2011 | Goncze | ............ | G05D 23/1346 236/12.11 |
| 9,720,426 B2 * | 8/2017 | Xie | ................ | F16K 11/0787 |
| 9,740,215 B2 * | 8/2017 | Ruga | ................ | G05D 23/1858 |
| 10,544,873 B2 * | 1/2020 | Sansum | ............ | G05D 23/1353 |
| 2002/0134848 A1 * | 9/2002 | Heinzelmann | ..... | G05D 23/1346 236/12.19 |
| 2004/0000594 A1 * | 1/2004 | Beck | ................. | G05D 23/1346 236/12.15 |
| 2006/0192166 A1 * | 8/2006 | Lange | ................ | F16K 3/08 251/264 |
| 2013/0099007 A1 * | 4/2013 | Baker | ................ | G05D 23/1346 236/12.11 |
| 2014/0326342 A1 * | 11/2014 | Lange | ................ | F16K 11/0782 137/625.12 |

FOREIGN PATENT DOCUMENTS

| | | | |
|---|---|---|---|
| FR | 2 869 087 A1 | 10/2005 | |
| WO | WO-2005103853 A1 * | 11/2005 | ......... G05D 23/1346 |

* cited by examiner a)

b)

c)

a)

b)

a)

b)

a)

b)

a)

b)

THERMOSTAT MIXING VALVE

CROSS REFERENCE TO RELATED APPLICATIONS

This application is the National Stage of PCT/EP2018/051749 filed on Jan. 24, 2018, which claims priority under 35 U.S.C. § 119 of German Application No. 20 2017 100 756.1 filed on Feb. 13, 2017, the disclosure of which is incorporated by reference. The international application under PCT article 21(2) was not published in English.

The invention relates to a thermostatic mixing valve for sanitary fittings, with a top piece, in which a cone is disposed to be axially movable via a rotatably mounted spindle, and a passage sleeve with windows for the supply of hot and cold water, in which a carriage preloaded via a spring and joined to a thermoelement provided with a control piston is axially movable, wherein the supply of hot and cold water through the windows can be regulated in dependence on the movement of the carriage.

Thermostatic mixing valves of the type considered here find application in thermostatically regulable mixing fittings for showers and/or bathtubs as well as fittings for bidets and washbasins. In these fittings, on the one hand the water flow can be regulated by the user and on the other hand the desired water temperature can be adjusted. The fittings have a cold-water supply and a hot-water supply. Both supplies discharge into a mixing chamber, which is in communication with the outlet of the fitting. A thermoelement that regulates the temperature set by the user is provided in the region of the mixing chamber. The thermoelement is capable of reacting to temperature fluctuations of the mixing water and, in dependence thereon, of restricting or releasing the supply of either the cold water or the hot water, so that the temperature desired by the user remains approximately constant.

In thermostatic mixing valves of the type mentioned in the introduction, the danger frequently exists that a satisfactory function of the valve is no longer assured in the event of a defect of the thermoelement, whereby the danger in particular exists that the carriage will be moved by the spring force in the direction of shutoff of the cold-water supply. In this case, exclusively hot water flows through the hot-water supply into the valve. Since the thermoelement is defective, the capability of an automatic reaction no longer exists. For the user, the danger exists of being scalded with hot water. In order to counteract this danger, it is proposed in DE 102 02 560 B4 that the cone be lengthened by a collar, which protrudes into the carriage, whereby a contact of collar and carriage is made possible. This thermostatic mixing valve, which by virtue of the elongated collar makes it possible for a mechanical linkage to be established that permits a shift of the carriage in the direction of the hot-water supply, has proved effective in practice. Such a mixing valve is complexly structured, however, wherein numerous faces within the valve are wetted with water in the installed condition, whereby impairments are able to develop due to lime deposits or the like.

Here the invention seeks to create a remedy. The task underlying the invention is to provide a thermostatic mixing valve of the aforesaid type, which is constructed simply and especially modularly and in which the faces wetted with water are reduced. This task is accomplished by a thermostatic mixing valve with the features according to the invention.

With the invention, a thermostatic mixing valve for sanitary fittings is provided, which is constructed simply and especially modularly and in which the faces wetted with water are reduced. By the fact that the cone comprises a bushing, which at its underside turned away from the spindle is sealed via a bottom and in which a conical piston is disposed to be axially movable and is preloaded via a spring in the direction of the bottom, wherein a coupling duct is disposed in axially aligned manner with the conical piston and which at the same time is axially aligned with the control piston of the thermoelement and into which the conical piston and/or the control piston of the thermoelement can be moved, springs and pistons are partitioned off from the water. The connection between the carriage disposed in the passage sleeve and the conical piston disposed in the top piece takes place through the coupling duct disposed in the bottom of the bushing of the cone, wherein the control piston bears on the conical piston in an upper position of the carriage in hot-water position or even in mixed-water position, wherein the bottom of the bushing is spaced apart from the carriage. In a lower position of the carriage in cold-water position, however, conical piston and control piston are decoupled, wherein the bottom of the sleeve of the cone rests on the carriage. In this contact position, therefore, a bypass of the thermoelement is established, whereby, in the event that the thermoelement is defective, a further, albeit limited control of the carriage can take place directly via the bottom of the bushing of the cone.

In an improvement of the invention, the bushing is closed via a cover side at its upper side turned toward the spindle, wherein the cover side has a guide bore, in which the conical piston is guided. Hereby a further partitioning of the bushing interior space is achieved. At the same time, the axial guidance of the conical piston within the bushing is improved.

In a configuration of the invention, the conical piston has a piston stem, with which it protrudes into the coupling duct. Hereby the guidance of the conical piston is further improved. At the same time, a closure of the bottom of the bushing is established by the piston stem, whereby an ingress of water into the bushing interior space is counteracted.

In a further configuration of the invention, the bushing has, at its end turned away from the spindle, a cone washer with a stop member, which is equipped centrally with a bore that forms the coupling duct, which cone washer forms the bottom of the bushing, with which it is immovably joined. This stop member is preferably designed in the form of a stop cone or of a stop taper. Hereby a seat is formed for the spring disposed within the bushing.

In a further configuration of the invention, the cone washer is crimped onto the bushing. Hereby a simple interlocking and frictional joint is achieved between the cone washer and the bushing.

In an improvement of the invention, the conical piston has an indentation, which corresponds with the stop member of the cone washer and can be received at least partly, preferably completely by that of the stop member. Hereby a guidance of the conical piston is achieved with simultaneous possibility of closure of the coupling duct.

In a configuration of the invention, the top piece has, at its end opposite the spindle, an axial collar equipped with a female thread, into which the passage sleeve can be screwed, which for this purpose is equipped with a male thread, wherein the core is situated in its upper end position turned toward the spindle, above the collar. Hereby a simple assembly of the valve upper part together with the passage sleeve, designed as a modular subassembly, is made possible. In this way, a damage of the cone in the course of the assembly together with the passage sleeve is counteracted by the positioning of the cone in an end position above the collar.

In a further configuration of the invention, a circumferential step, which bounds a radial sealing groove that receives an O-ring, is formed in end position onto the collar, wherein a circumferential ridge, which has a radial sealing groove that receives an O-ring is disposed on the passage sleeve between its windows, and wherein preferably a braided screen-jacket is disposed between the step of the top piece and the ridge of the passage sleeve. Hereby a two-sided sealing of the cold-water supply window of the passage sleeve is achieved in one fitting. At the same time, a fouling of the thermostatic mixing valve is counteracted by the braided screen-jacket preferably disposed between the two O-rings.

In an improvement of the invention, the passage sleeve is equipped with a bottom piece, which bounds a space in which the carriage joined to the thermoelement is disposed. Hereby a closed subassembly of the passage sleeve assembled together with the thermoelement as well as the carriage is achieved as a module.

In a further configuration of the invention, the passage sleeve has, on its upper side turned toward the spindle, a circumferential radial collar, which forms a stop for the carriage and which bounds a passage opening for a guide collar, which is formed onto the carriage and in which the control piston of the thermostat element is guided. Hereby a further sealing of the bushing of the cone against penetrating water is achieved. The control piston of the thermoelement emerging from the passage sleeve is therefore sealed well relative to the passage sleeve.

In an improvement of the invention, the guide collar of the carriage is aligned with the coupling duct, whereby the coupling duct is prolonged. Hereby an optimum conjunction of control piston and conical piston is achieved. In the case that the bottom of the bushing of the cone rests on the carriage, a straight-through coupling duct is formed between sleeve bottom and guide collar of the carriage.

In a configuration of the invention, the passage sleeve has an axial collar, which is equipped with the male thread, wherein an annular step encircling the passage opening is formed on concentrically with the collar, whereby an annular groove is bounded. For this purpose, a circumferential ridge, the inside diameter of which corresponds substantially to the outside diameter of the annular step of the passage sleeve and which can be introduced into the annular groove, is preferably disposed on the bushing at its side turned away from the spindle. Hereby a guidance of the bushing for bracing of the bottom of the bushing on the carriage in cold-water position is achieved. In the event that the bottom is formed by a cone washer crimped onto the bushing, this ridge is formed by the crimped edge.

In a further configuration of the invention, a radial sealing groove, which receives an O-ring, is made in the annular step. Hereby a sealing of the guide collar formed onto the carriage is achieved relative to the passage sleeve.

In an improvement of the invention, the bottom piece has on the bottom side an annular sieve disk, through which the thermoelement protrudes. Hereby an optimum circumferential circulation of mixed water around the thermoelement is achieved.

Preferably a spring, via which the carriage is preloaded in the direction of the radial collar of the passage sleeve, is disposed between the annular sieve disk and the carriage.

In a configuration of the invention, the bottom piece is equipped with a male thread, with which it can be screwed into a female thread disposed in end position in the passage sleeve. Hereby the mounting of the modularly designed subassembly of the passage sleeve together with carriage, thermoelement and spring on the subassembly of the top piece is facilitated.

In a further configuration of the invention, a circumferential ridge, which bounds the male thread and has a radial sealing groove that receives an O-ring, is formed onto the bottom piece, wherein preferably a braided screen-jacket is disposed between the ridge, the passage sleeve and the ridge of the bottom piece. Hereby a two-sided sealing of the hot-water supply window of the passage sleeve is achieved. A fouling of the passage sleeve is counteracted by the preferably disposed braided screen-jacket.

Other improvements and configurations of the invention are specified below. An exemplary embodiment of the invention is illustrated in the drawings and will be described in detail in the following, wherein.

Figure 1:
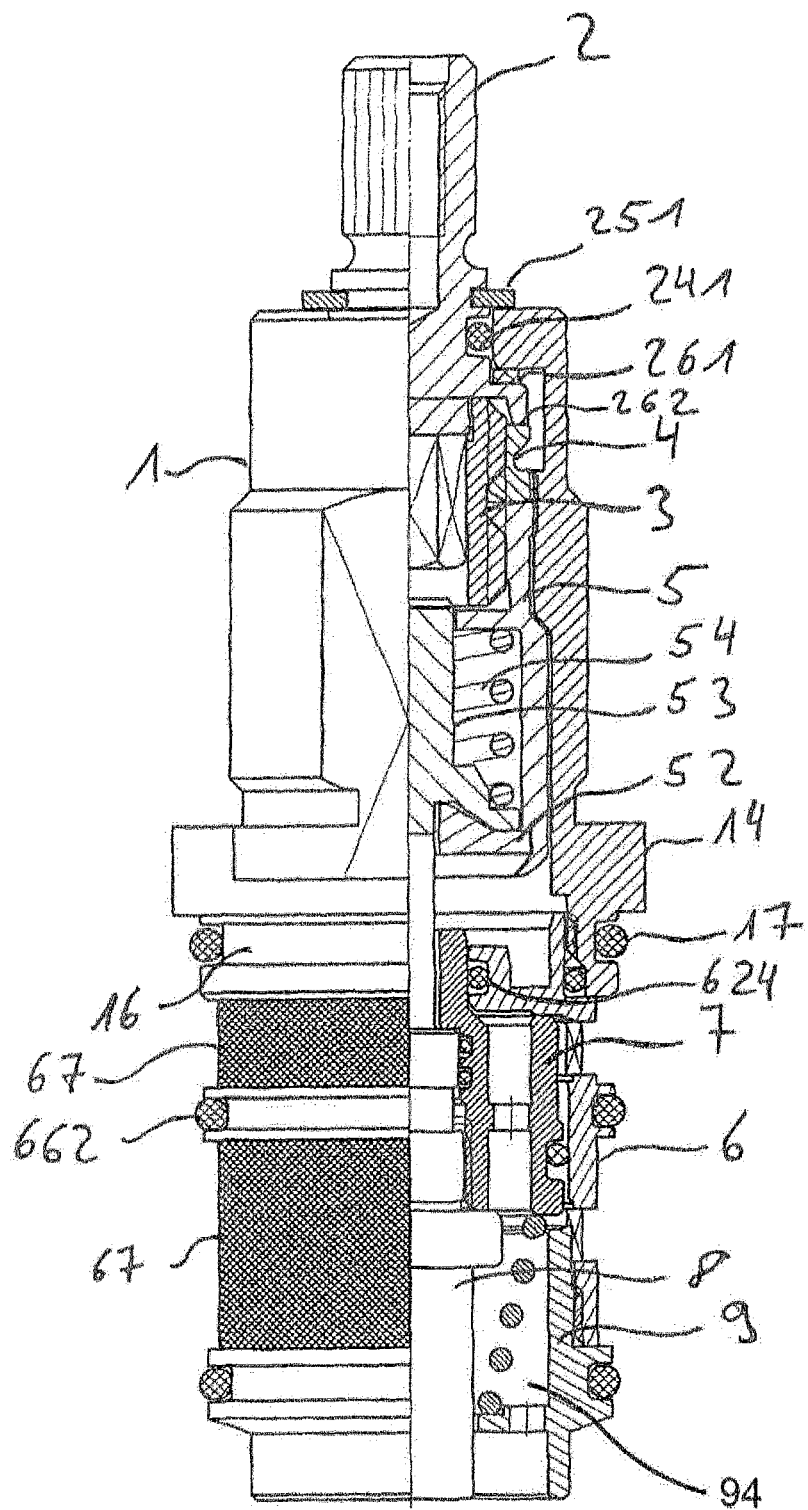
FIG. 1 shows the schematic diagram of a thermostatic mixing valve for sanitary fittings in partial cutaway view
 a) in "hot-water supply" carriage position;
 b) in "mixed-water supply" carriage position;
 c) in "cold-water supply" carriage position.
Figure 1:
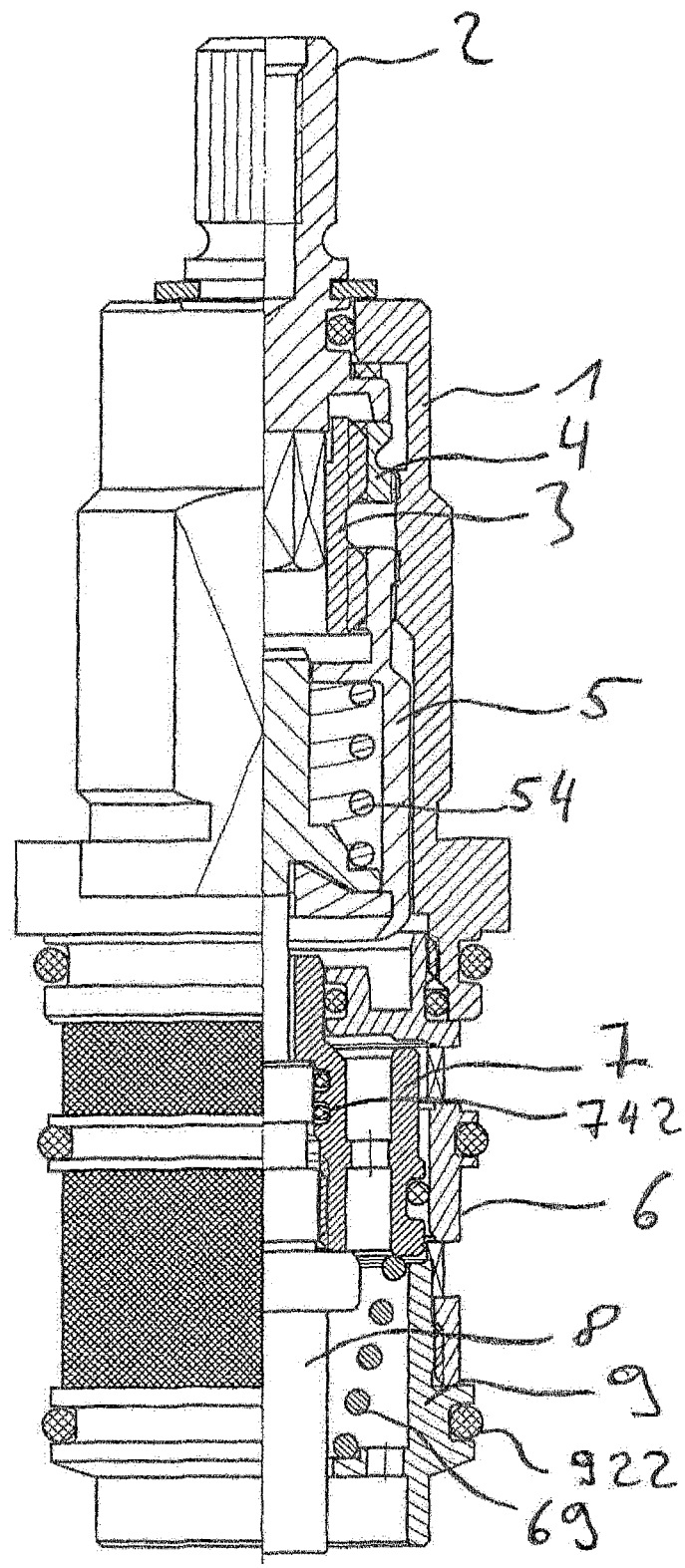
Figure 1:
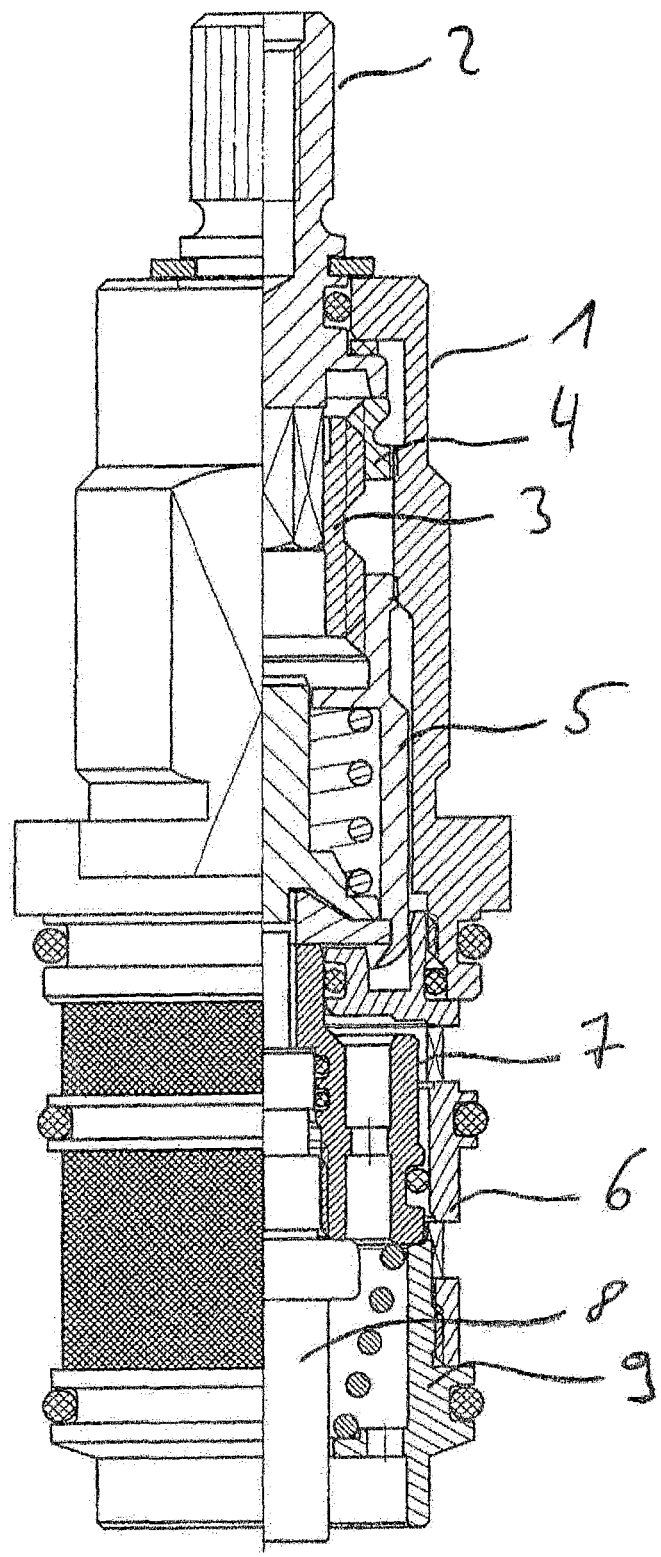
Figure 2:
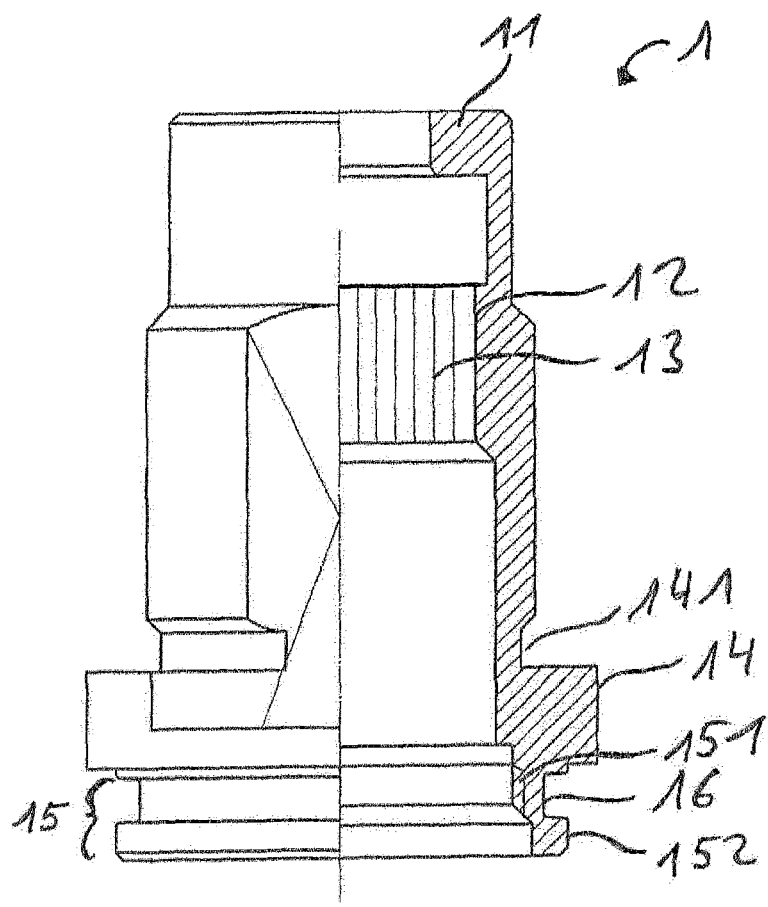
FIG. 2 shows the diagram of the top piece of the thermostatic mixing valve from FIG. 1
 a) in partial cutaway view;
 b) in the overhead view.
Figure 2:
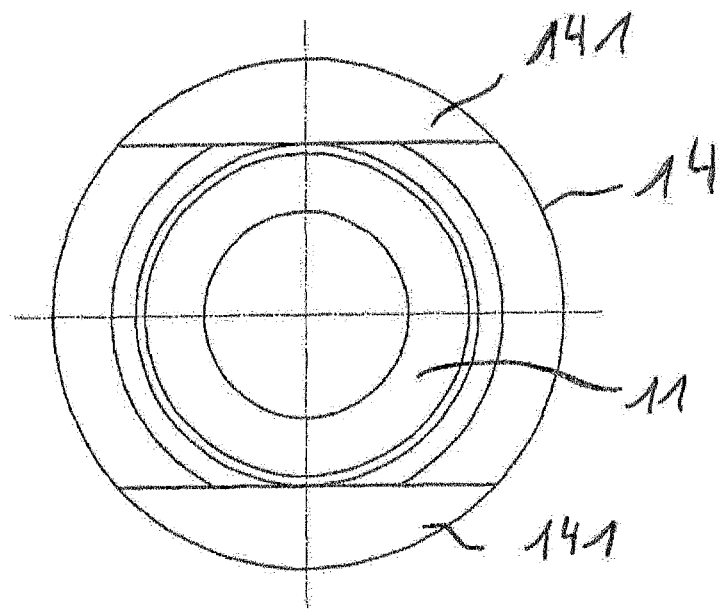
Figure 3:
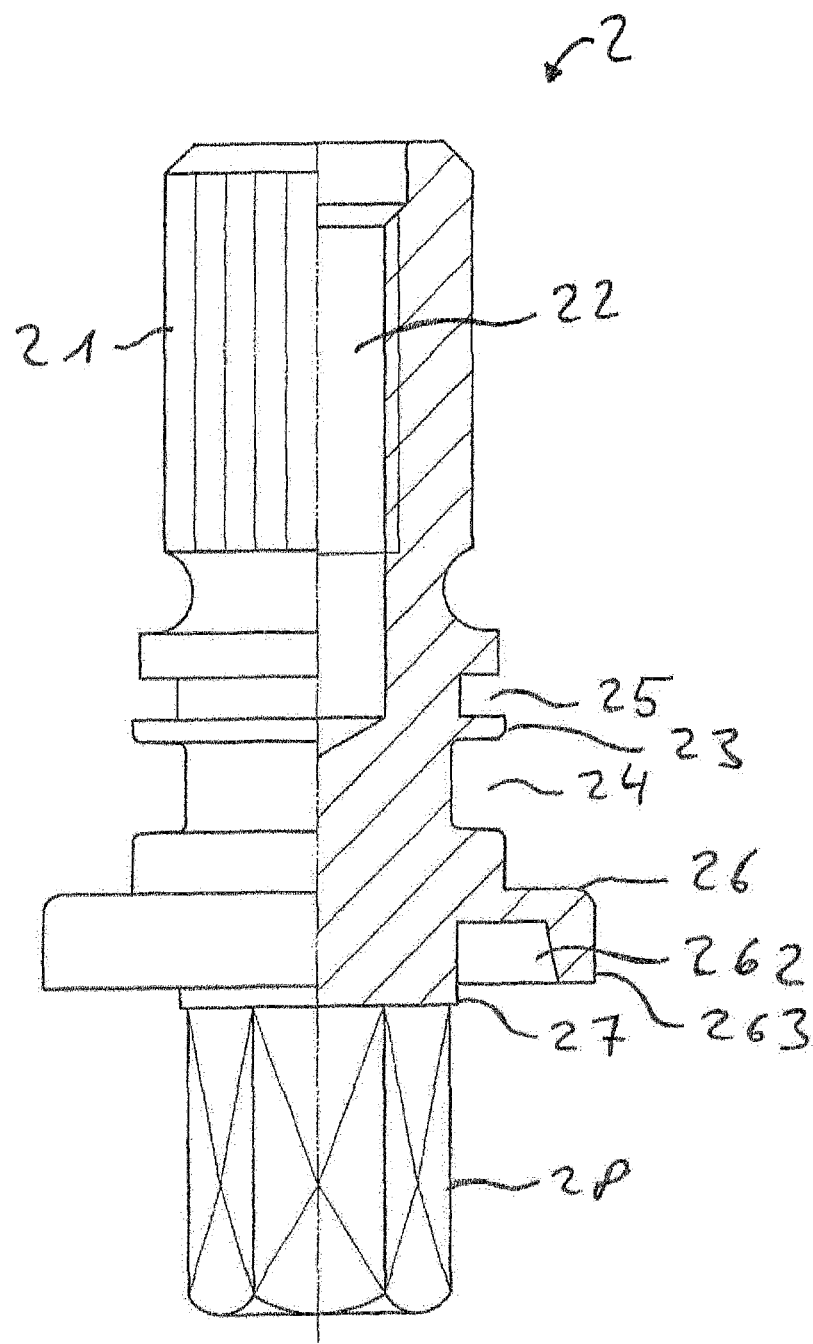
FIG. 3 shows the diagram of the spindle of the thermostatic mixing valve from FIG. 1 in partial cutaway view.
Figure 4:
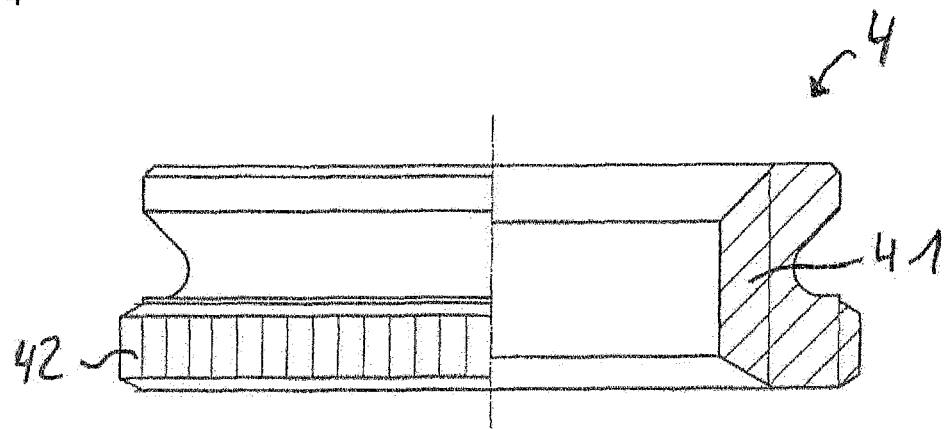
FIG. 4 shows the diagram of the thrust piece of the thermostatic mixing valve from FIG. 1 in partial cutaway view.
Figure 5:
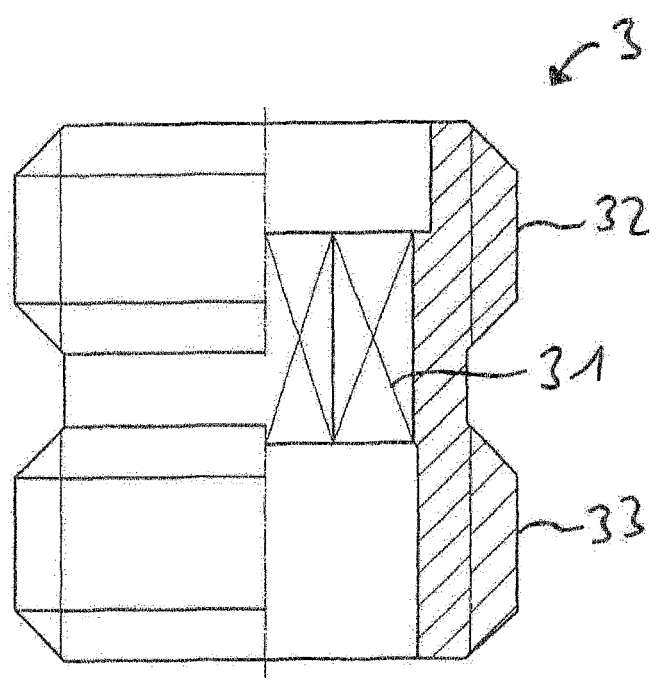
FIG. 5 shows the diagram of the threaded ring of the thermostatic mixing valve from FIG. 1 in partial cutaway view.
Figure 6:
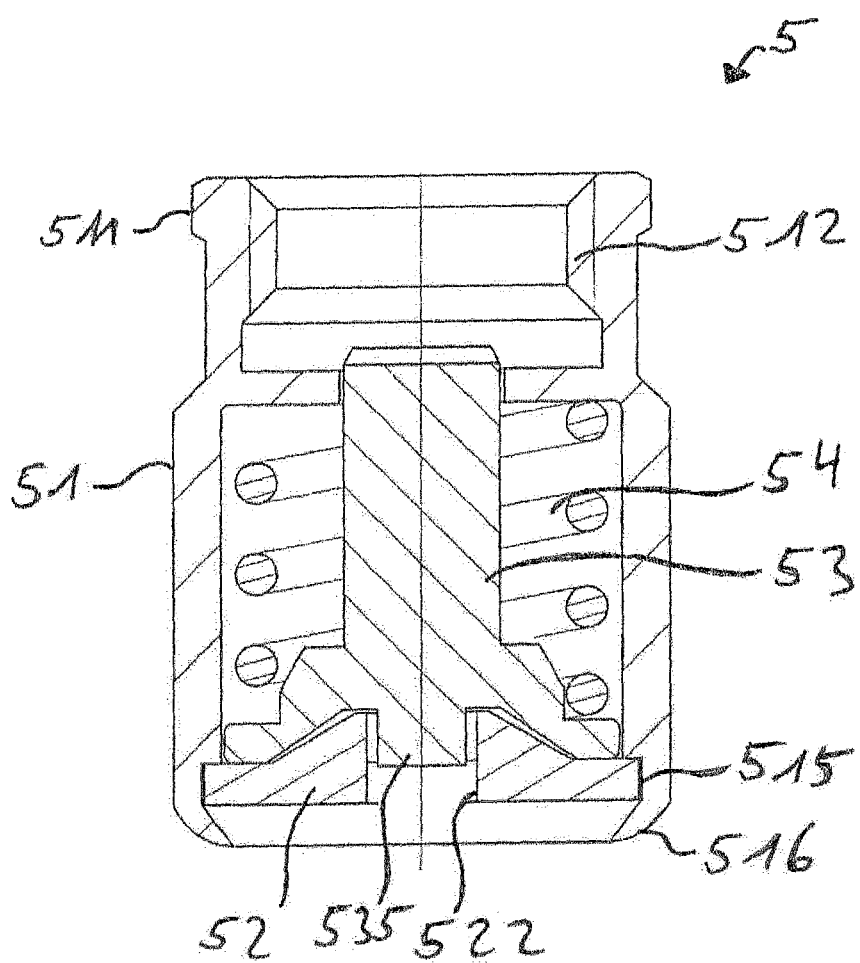
FIG. 6 shows the diagram of the cone of the thermostatic mixing valve from FIG. 1 in longitudinal section.
Figure 7:
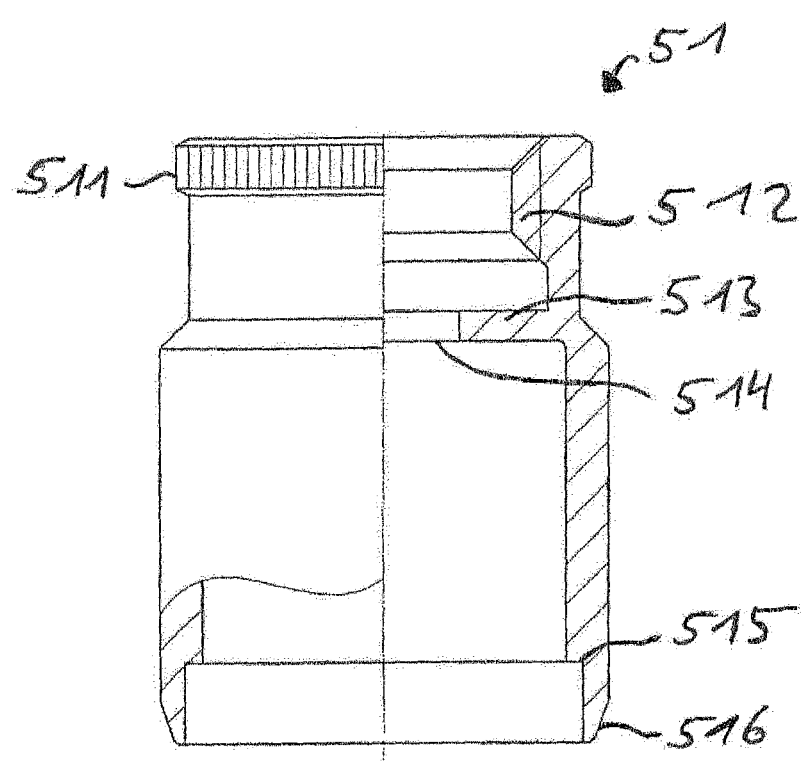
FIG. 7 shows the the bushing of the cone from FIG. 6 in partial cutaway view.
Figure 8:
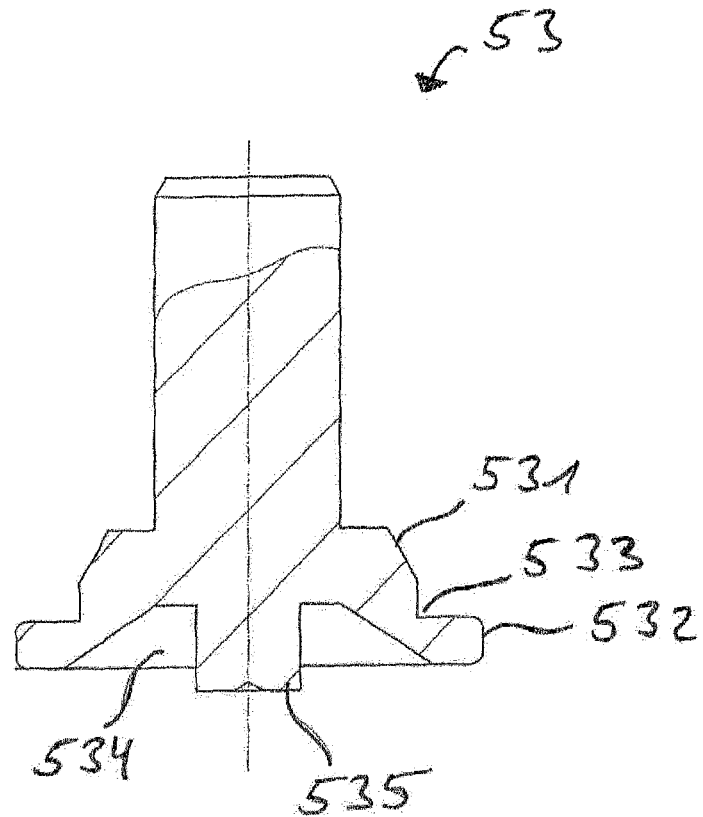
FIG. 8 shows the the conical piston of the cone from FIG. 6 in partial cutaway view.
Figure 9:
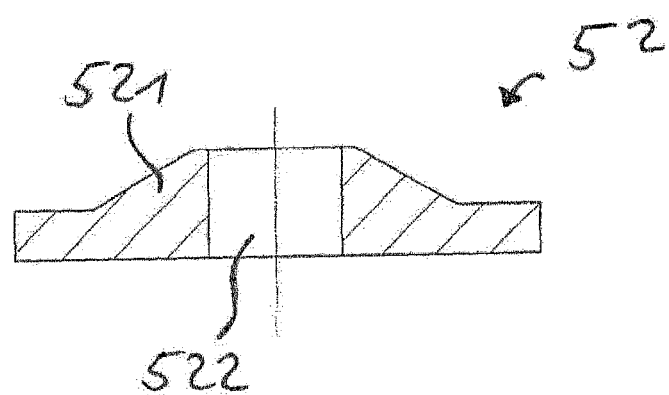
FIG. 9 shows the cone washer of the cone from FIG. 6 in longitudinal section.
Figure 10:
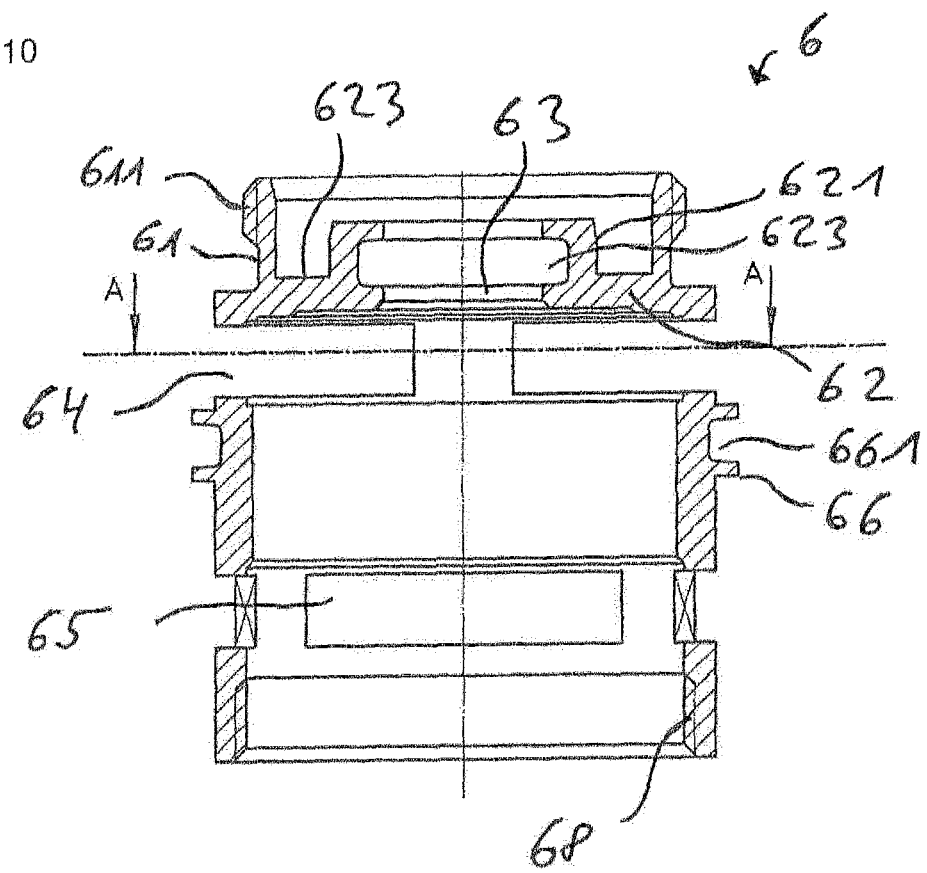
FIG. 10 shows the diagram of the passage sleeve of the thermostatic mixing valve from FIG. 1
 a) in longitudinal section;
 b) in sectional diagram A-A.
Figure 10:
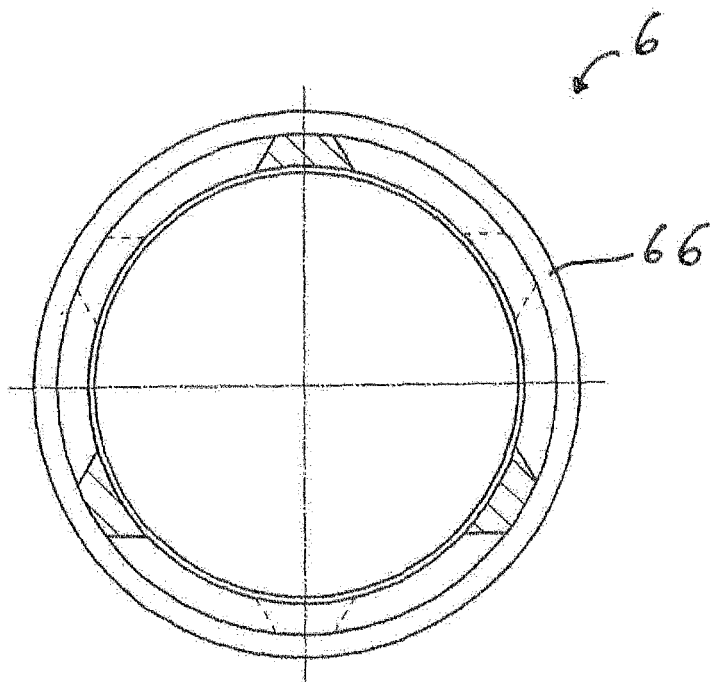
Figure 11:
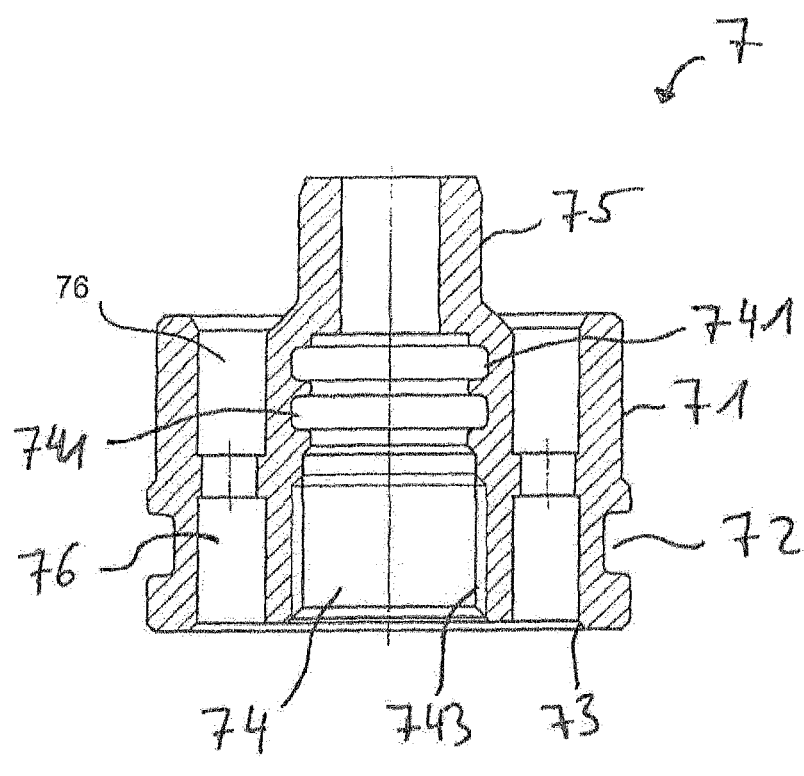
FIG. 11 shows the diagram of the carriage of the thermostatic mixing valve from FIG. 1
 a) in longitudinal section;
 b) in the overhead view.
Figure 11:
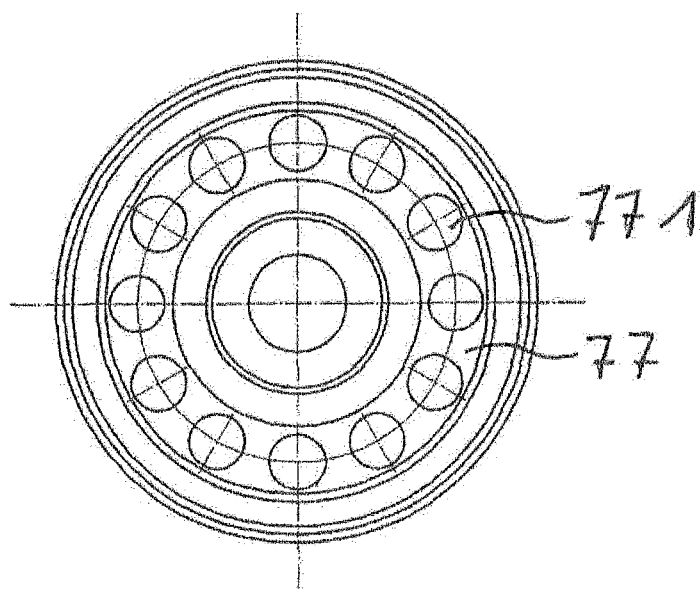
Figure 12:
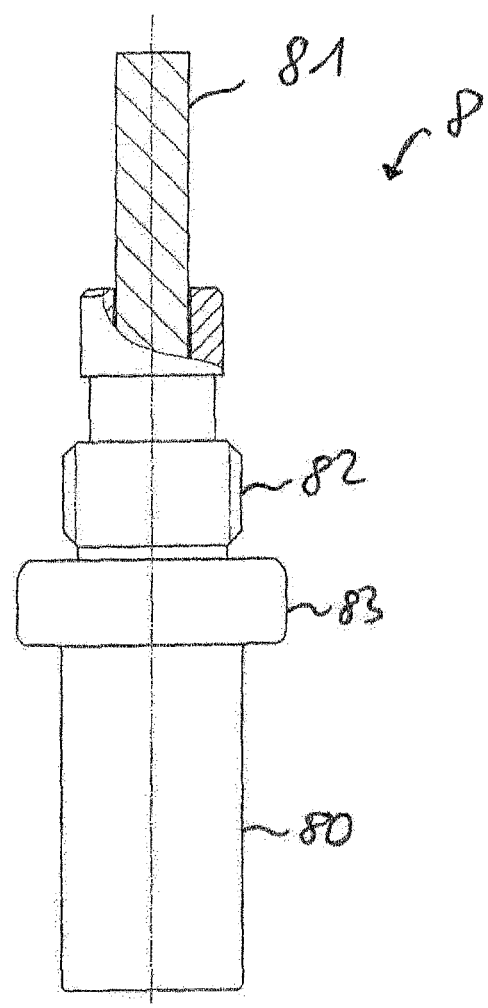
FIG. 12 shows the diagram of the thermostat element of the thermostatic mixing valve from FIG. 1
Figure 13:
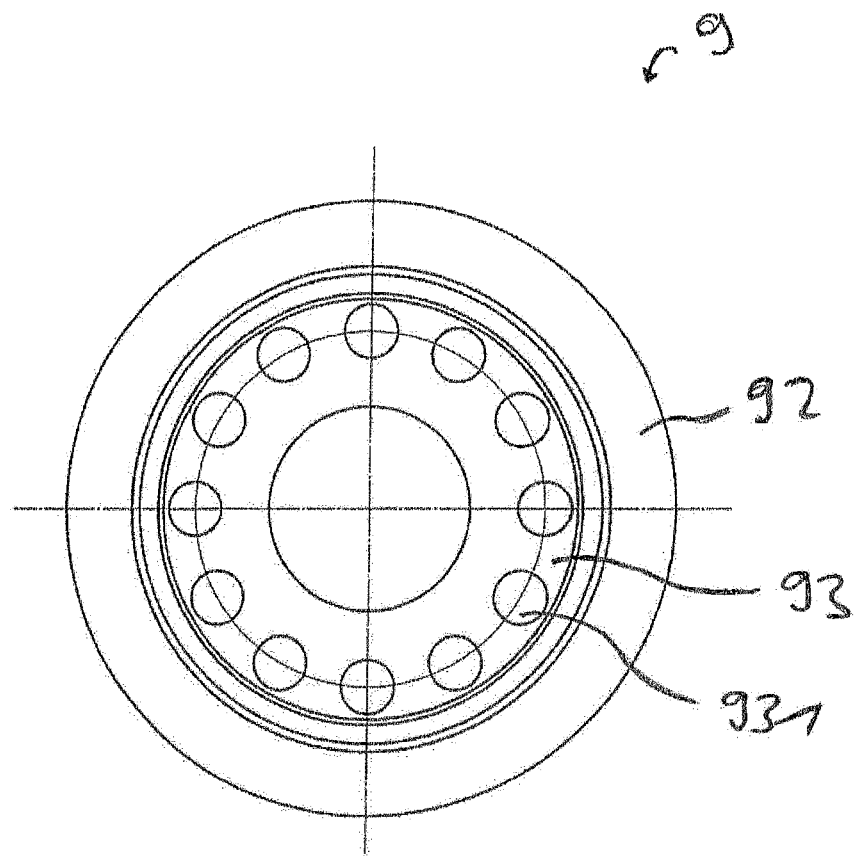
FIG. 13 shows the diagram of the bottom piece of the thermostatic mixing valve from FIG. 1
 a) in the overhead view;
 b) in longitudinal section.
Figure 13:
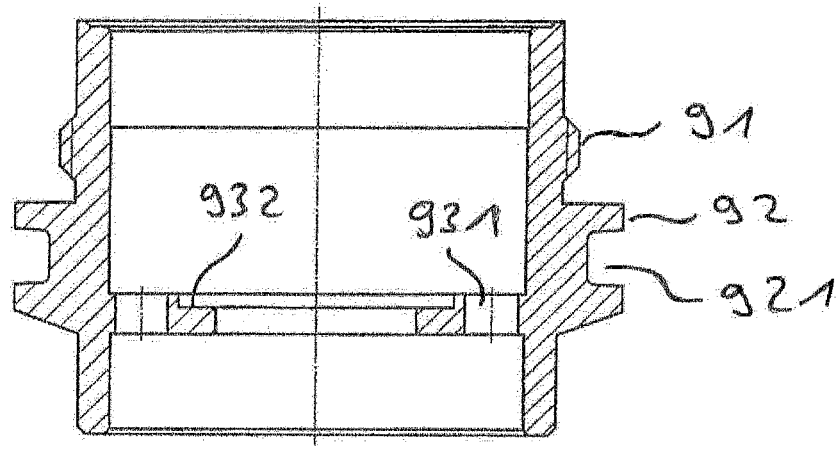

The thermostatic mixing valve selected as the exemplary embodiment has a top piece 1, which is equipped at the end side with a rotatable and radially guided spindle 2, which corresponds with a threaded sleeve 3, which is disposed to be axially movable in the top piece 1 via a threaded ring 4. The threaded sleeve 3 is in connection with a cone 5, which is guided axially on the top piece 1. At its end turned away from the spindle 2, the top piece 1 is screwed together with a passage sleeve 6, in which a carriage 7 that is joined to a thermoelement 8 is movably disposed. At its end opposite the spindle 2, a bottom piece 9 is screwed into the passage sleeve 6.

The top piece 1 consists of a symmetrical hollow member, the two end faces of which are open. In the region of the spindle 2, the top piece 1 is equipped with a reduced rim 11, on which the spindle 2 is axially braced as well as radially guided. A stepped hollow-cylindrical part 12 is attached to the rim 11. A polygonal socket 13 is provided spaced apart from the rim 11 inside the hollow-cylindrical part 12. The polygonal socket 13 prevents a rotation of the threaded ring 4 as well as of the cone 5 within the top piece 1. At its end turned away from the spindle 2, a support flange 14, which is equipped with recesses 141 for the engagement of an open-ended wrenching tool, is formed onto the top piece. An axial collar 15, which is equipped with a female thread 151, is formed onto the support flange 14. Spaced apart from the support flange 14, a step 152, which bounds an annular groove 16 for receiving an O-ring 17, is formed in end position onto the collar 15.

At its one end, the spindle 2 is constructed externally as a polygonal surface 21 and is equipped internally with a blind hole 22 with female thread, which forms a receptacle for a turning handle or lever, not illustrated. Spaced apart from the polygonal surface 21, an annular face 23, with which the spindle 2 is guided radially at the rim 11 of the top piece 1, is provided externally on the spindle 2. The annular face 23 is interrupted by an annular groove 24, which receives an O-ring 241. On the side turned toward the polygonal surface 21, a notch 25, which receives a locking ring 251 that rests externally on the rim 11, is provided at the attachment to the annular face 23. On the side turned away from the polygonal surface 21, the spindle 2 has, at the attachment to the annular face 23, a spindle shoulder 26, the diameter of which is greater than that of the annular face 23. On the spindle shoulder 26, an annular washer 261, which is made of bronze, for example, is placed around the annular face 23. On its underside turned away from the annular washer 261, an annular recess 262 is made in the spindle shoulder 26.

In the spindle 2 inserted into the top piece 1, the annular washer 261 bears on the reduced rim 11. At the connection to the spindle shoulder 26, a step 27 is provided, to which an external polyhedral surface 28 is attached.

The external polyhedral surface 28 of the spindle 2 protrudes in mounted position into the threaded sleeve 3, which is formed internally as polyhedral socket 31. Externally, the threaded sleeve 3 is equipped with two threads 32 and 33 spaced apart from one another. The threads 32 and 33 are oriented in opposite directions. The threaded sleeve 3 is screwed by the thread 32 together with the threaded ring 4, which for this purpose is equipped with a female thread 41. Externally, the threaded ring 4 has an external polygonal surface 42 on its side turned away from the spindle 2. The external polygonal surface 42 corresponds with the polygonal socket 13 of the top piece 1. Thereby the threaded ring 4 is held to rotate with the top piece 1 but to be axially movable therein. With its side turned toward the spindle 2, the threaded ring 4 is braced on the collar 263 formed by the annular recess 262 of the spindle bushing 26.

The cone 5 consists substantially of a bushing 51, which is closed on the bottom side via a cone washer 52 and which receives a conical piston 53, which is preloaded via a helical spring 54 against the cone washer 52.

The bushing 51 is designed to be substantially hollow cylindrical. At its end turned toward the spindle 2, it has an external polygonal surface 511, which corresponds with the polygonal socket 13 of the top piece 1, whereby the bushing 51 is guided in a manner secured against rotation in the top piece 1. Internally, a female thread 512, by means of which the bushing 51 of the cone 5 is screwed together with the thread 33 of the threaded sleeve 3, is made in the bushing 51 at the height of the external polygonal surface 511. Spaced apart from the female thread 512, a cover side 513, in which a guide bore 514 is made centrally, is formed in the bushing 51. At its end opposite the cover side 513, an annular groove 515 for receiving a cone washer 52, to which a crimped ridge 516 is attached, via which the cone washer is immovably joined to the bushing 51 by means of crimping, is made internally in the bushing 51.

The cone washer 52 is designed in the form of a circular disk, onto which the cover side 513 of the the side turned toward the bushing 51 is formed by means of a stop cone 521. Centrally, a bore 522 passing through the stop cone 521 is made in the cone washer 52.

The conical piston 53 is designed to be substantially cylindrical. At its end turned toward the cone washer 52, a step 531 of larger diameter, which merges into a plate 532 of even larger diameter, is formed onto it, whereby a spring seat 533 for the helical spring 54 is formed in the transition between the step 531 and the plate 532. The plate 532 is equipped centrally with a conical indentation 534, which corresponds to the stop cone 521 of the cone washer 52. A cylindrical piston stem 535, the outside diameter of which is smaller than the inside diameter of the bore 522 of the cone washer 52, into which the piston stem 535 protrudes, is formed on centrally in the conical indentation 534. With its end disposed opposite the piston stem 535, the conical piston 53 passes through the guide bore 514 of the bushing 51, in which the conical piston 53 is guided axially. A helical spring 54, which at the opposite end is braced on the cover side 513 of the bushing 41, and by which the conical piston 53 is preloaded against the cone washer 52, is disposed on the spring seat 533 of the conical piston 53.

The passage sleeve 6 is designed to be substantially hollow cylindrical and at its end turned toward the spindle 2 has an axial collar 61 with a male thread 611, with which it can be screwed into the female thread 151 of the top piece 1. At the attachment to the external thread 611, the passage sleeve 6 has internally a circumferential radial collar 62, which forms a stop for the carriage 7 and which bounds a passage opening 63 for a guide collar 75, which is formed onto the carriage 7. Concentrically with the axial collar 61 of the passage sleeve 6, which is equipped with the male thread 611, an annular step 621 that encircles the passage opening 63 is formed on and together with the axial collar 61 bounds an axial annular groove 622. Furthermore, a radial annular groove 623, which receives an O-ring 624, is made in the step 621.

Spaced apart from the radial collar 62, windows 64, which are cut out from their wall in symmetrically distributed manner in the same plane, are provided for the passage of water in the passage sleeve 6. Three windows 64 are provided in the exemplary embodiment. The windows 64 are provided for the passage of cold water. Spaced apart axially from the windows 64, windows 65, which substantially have the same cross section as the windows 64 and are designed in a manner comparable to the windows 64, are provided for the passage of hot water. Between the windows 64 and 65, a ridge 66, which is equipped with a radial annular groove 661 that receives an O-ring 662, is formed externally circumferentially on the passage sleeve 6. The O-ring 662 separates hot-water and cold-water regions. A braided screen-jacket 67 is disposed circumferentially between the step 152 of the top piece 1 and the circumferential ridge 66 of the passage sleeve 6. The braided screen-jacket 67 functions for prevention of penetrating dirt particles.

A female thread 68 for screwing in of the bottom piece 9 is disposed on the passage sleeve 6 at its end opposite the axial collar 61.

The carriage 7 is disposed in the region of the windows 64 and 65 of the passage sleeve 6. Externally, it has a cylindrical face 71, in which an annular groove 72 is made. The annular groove 72 receives an O-ring 721, with which the carriage 7 is sealed relative to the passage sleeve 6. On its axial side turned away from the spindle 2, the carriage 7 is equipped with a circular depression 73. A coil spring 69 is braced on the depression 73. At its other end, the coil spring 69 is braced on the side of the annular sieve disk 93 of the bottom piece 9 turned toward the spindle 2, such that it is screwed with its male thread 91 into the female thread 68 of the passage sleeve 6. A penetration 74, which functions for receiving the thermoelement 8, is made centrally in the carriage 7. The penetration 74 is equipped with undercuts 741 for receiving O-rings 742, which seal the thermoelement 8 relative to the carriage 7. The penetration 74 discharges into a guide collar 75, which is formed onto the carriage 7 and the outside diameter of which corresponds substantially to the inside diameter of the passage opening 63 of the passage sleeve 6, through which the guide collar 75 extends and is sealed via the O-ring 624 relative to the passage sleeve 6. Around the penetration 74, annular depressions 76, which discharge into a sieve plate 77 and which function together with bores 771 for the passage of cold water entering through the windows 64 of the passage sleeve 6, are made in the carriage 7 on both sides.

The penetration 74 of the carriage 7 receives a thermoelement 8, which has a control piston that extends through the guide collar 75 and is guided by it. The thermoelement 8 is designed in a way known in itself. In a metal housing 80, it contains a liquid that varies in its volume in dependence on the temperature. Depending on temperature, the control piston 1 guided in the thermoelement 8 is positioned in axial direction. Externally, a male thread 82 is disposed on the thermoelement 8, so that it can be screwed into a female thread 743 made in end position in the penetration 74 of the carriage 7. Spaced apart from the male thread 82, a step 83, which projects beyond this and bears on the carriage 7, is furthermore formed on.

The bottom piece 9 is designed to be substantially hollow cylindrical and at its outer side is equipped with a male thread 91 for screwing into the female thread 68 of the passage sleeve 6. Spaced apart from the male thread 91, a circumferential ridge 92, which is equipped with an annular groove 921 for receiving an O-ring 922, is formed onto the bottom piece 9. Underneath the annular groove 921, an annular sieve disk 93, which is equipped circumferentially with bores 931 for the passage of water, is disposed internally in the bottom piece 9. On its side turned toward the passage sleeve 6, the annular sieve disk 93 is provided with a depression 923 as bracing surface of the coil spring 69. The inside diameter of the annular sieve disk 93 is larger than the housing 80 of the thermoelement 8, which extends through the annular sieve disk 93.

The passage sleeve 6 forms, with the carriage 7 equipped with a thermoelement 8 as well as the bottom piece 9 screwed together therewith, a subassembly that is screwed as such onto the subassembly of the top piece 1. In this case, the control piston 81 of the thermoelement 8 extending through the guide collar 75 of the carriage 7 protrudes into the bore 522, forming a coupling duct, of the cone washer 52 of the cone 5, where it comes into contact on the piston stem 535 of the conical piston 53, which protrudes from the opposite side through the bore 522 of the cone washer 52.

In the mounted state, the mixing valve is inserted immovably into a fitting. A rotation of the spindle 2 via the polygonal surface 21 by means of a turning handle, not illustrated, leads on the basis of the polygonal surfaces 28, 31, which engage in one another, of spindle 2 and threaded sleeve 3, to a rotational movement of the threaded sleeve 3. The rotational movement of the threaded sleeve 3 leads on the one hand, by the fact that the arrangement of the threaded ring 4 is fixed to rotate therewith, to an axial movement of the threaded sleeve 3 itself as well as by the fact that the arrangement of the cone 5 in the top piece 1 is fixed to rotate therewith by the combination of the polygonal surfaces 13, 511 of top piece 1 and cone 5, to an axial movement of the cone 5. Such an axial movement of the cone 5 brings about a shift, via the contact of the conical piston 53 with the control piston 81 of the thermoelement 8, of the carriage 7 receiving the thermoelement 8, whereby the desired mixing position of the carriage 7 between the windows 64 (cold water passage) and 65 (hot-water passage) is achieved. In the process, the carriage 7 is moved against the spring tension of the spring 69. The cold water and hot water flowing in through the windows 64, 65 circulates around the thermoelement 8, which via the control piston 81 takes over the adjustment of the desired temperature.

A further rotation of the spindle 2 in this direction brings about an axial movement of the cone 5 in the direction of bottom piece 9, whereby in end position the window 64 for the passage of cold water is opened completely and the window 65 for the passage of hot water is closed (see FIG. 1c). In this end position, the control piston 81 of the thermoelement 8 is retracted by the contracting liquid present in the housing 80, until the control piston 81 and the conical piston 53 are out of contact. In this position, the cone washer 52 of the cone 5 rests on the guide collar 75 of the carriage 7, wherein the crimping ridge 516 engages in the axial annular groove 622 of the radial collar 62. In this way, the carriage 7 can be manipulated—while bypassing the thermoelement 8—via the direct contact with the cone washer 52 of the cone 5.

A rotation of the spindle 2 in the opposite direction brings about an axial movement of the cone 5 in the direction of the spindle 2. This axial movement is limited by the stop of the axial sides, facing one another, of the threaded sleeve 3 and of the cone 5. The axial movement is supported by the springs 69, 54 in dependence on the position of the cone 5 or of the carriage 7. Certainly the cone 5 is not joined directly to the carriage 7; but under the influence of the spring 69, the carriage 7 is moved in the direction of the spindle 2. In this end position, the window 64 is closed for the passage of cold water; the window 65 is opened for the passage of hot water (see FIG. 1a).

The mixing valve is under the influence of the pressure prevailing in the piping system to which the mixing valve is attached. This pressure causes a force in axial direction, which acts on the cone 5 in the direction of the spindle 2. Likewise, a force can develop in this direction when the spring 54, due to its bracing on the conical cone 53 and its bracing on the control piston 81 of the thermoelement 8, is compressed by extension of the control piston 81 and thus generates an axial force on the cone 5 in the direction of the spindle 2. Since the cone 5, the threaded sleeve 3 and the threaded ring 4 are joined to one another via threads, an axial movement of these three parts relative to one another is not possible without simultaneous rotation relative to one another. An unwanted rotation of the three parts relative to one another is prevented by the fact that a displacement traveled in axial direction due to the force of cone 5 is transmitted without displacement losses via the threaded sleeve 3 to the threaded ring 4. Due to its axially movable mounting in the top piece 1, the threaded ring 4 presses against the spindle shoulder 26 of the spindle 2. Thereby the spindle 2 likewise experiences an axial force, which it relays by means of the spindle shoulder 26 to the ring 261, which braces it on the inside of the reduced rim 11 of the top piece 1. Thereby the shoulder 26 of the spindle 2 is held pressed between the threaded ring 4 and the ring 261, whereby a rotary movement of the spindle 2 and thus an automatic change of the setting chosen by the user is effectively prevented. The axial-free mounting of the threaded sleeve 3 and the further transmission of the axial force to the spindle shoulder 26, which in turn bears on the reduced rim 11 of the top piece 1, is to be considered substantially as a disk brake. The provision of the ring 261, as is illustrated in the present case, additionally functions for minimization of the wear.

The regulation of the mixing valve by means of the thermoelement 8 takes place as follows: In the position of the carriage 7 illustrated in FIG. 1a), only hot water flows through the window 65 of the passage sleeve 6 into the mixing chamber 94, which is surrounded by the housing 80 of the thermoelement 8 and is formed within the bottom piece 9. The metal housing 80 relays the high temperature of the water to the liquid, present within the housing, the volume of which increases under the effect of the high temperature. Hereby the control piston 81 is moved in the direction of the spindle 2, whereby simultaneously the conical piston 53 currently in contact with the control piston 81 is urged by a force in the direction of the spindle 2. However, since the preload force of the spring 54 is greater than the preload force of the spring 69, the conical piston 53 does not change its position; to the contrary, the thermoelement 8 as well as the carriage 7 joined thereto is moved in the opposite direction, whereby a slit is uncovered by the carriage 7 in the region of the window 64, so that cold water is also able to flow into the mixing chamber 94 (see FIG. 1b).

The situation is comparable when cold water alone is flowing into the mixing chamber 94. In this case, the volume of the liquid present in the metal housing 80 of the thermoelement 8 is reduced, whereby the control piston 81 is moved downward. Under the influence of the spring 69, the carriage 7 in this case is moved together with the thermoelement 8 in the direction of the spindle 2, whereby the entry of hot water through the window 65 into the mixing chamber 94 is permitted.

By this possibility, illustrated in the foregoing, of the coupling of cone washer 52 and carriage 7, a safety function is additionally achieved. If, for example, the thermoelement 8 is defective, or if its mechanical connection to the carriage 7 is interrupted or is completely lacking, the mixing valve no longer has the ability to adjust an approximately constant temperature. In this case, what happens is that the cold-water supply is shut off and the hot-water supply is completely opened, whereby the danger of a scalding exists for the user, since in this case hot water alone is passing into the mixing chamber 94. By rotation of the spindle 2 in the direction of the "cold water" setting by the user, the cone 5 is moved axially in the direction of the carriage. In the process, the cone washer 52 of the cone 5 is moved via the spindle 2 onto the guide collar 75 of the carriage 7, whereby it is moved back into cold-water position and the hot-water supply is closed. Hereby the danger of a scalding of the user is prevented.

The invention claimed is:

1. A thermostatic mixing valve for sanitary fittings, with a top piece, in which a cone is disposed to be axially movable via a rotatably mounted spindle, and a passage sleeve with windows for the supply of hot and cold water, in which a carriage preloaded via a first spring and joined to a thermoelement provided with a control piston is axially movable,
   wherein the supply of hot and cold water through the windows can be regulated in dependence on the movement of the carriage,
   wherein the cone comprises a bushing, which at an underside of the cone turned away from the rotatably mounted spindle is closed via a bottom and in which a conical piston is disposed to be axially movable and is preloaded via a second spring in the direction of the bottom,
   wherein a coupling duct is disposed in the bottom in axially aligned manner with the conical piston and which at the same time is axially aligned with the control piston of the thermoelement and into which the conical piston and/or the control piston of the thermoelement can be moved,
   wherein, in an upper hot-water position of the carriage, the control piston bears on the conical piston and the bottom is spaced apart from the carriage and, in a lower cold-water position of the carriage, the control piston is spaced apart from the conical piston and the bottom rests on the carriage,
   wherein the top piece has, at its end opposite the rotatably mounted spindle, an axial collar equipped with a female thread, into which the passage sleeve can be screwed, which for this purpose is equipped with a male thread, wherein the cone is situated in an upper end position of the cone turned toward the rotatably mounted spindle, above the axial collar,
   wherein a circumferential step, which bounds a radial sealing groove that receives an O-ring, is formed in end position onto the axial collar, wherein a circumferential ridge, which has a radial sealing groove that receives an O-ring is disposed on the passage sleeve between windows of the passage sleeve, and
   wherein a braided screen-jacket is disposed between the circumferential step of the top piece and the circumferential ridge of the passage sleeve.

2. The thermostatic mixing valve according to claim 1, wherein the bushing is closed at its upper side turned toward the rotatably mounted spindle via a cover side, which has a guide bore, in which the conical piston is guided.

3. The thermostatic mixing valve according to claim 1, wherein the conical piston has a piston stem, with which the conical piston protrudes into the coupling duct.

4. The thermostatic mixing valve according to claim 1, wherein the bushing has, at an end of the bushing turned away from the rotatably mounted spindle, a cone washer with a stop member, which is equipped centrally with a bore that forms the coupling duct, which cone washer forms the bottom of the bushing, to which the cone washer is immovably joined.

5. The thermostatic mixing valve according to claim 4, wherein the cone washer is crimped onto the bushing.

6. The thermostatic mixing valve according to claim 4, wherein the conical piston has an indentation, which corresponds with the stop member of the cone washer and can be received at least partly by an indentation of the stop member.

7. The thermostatic mixing valve according to claim 1, wherein the passage sleeve is equipped with a bottom piece, which bounds a space in which the carriage joined to the thermoelement is disposed.

8. The thermostatic mixing valve according to claim 1, wherein the passage sleeve has, on an upper side of the passage sleeve turned toward the rotatably mounted spindle, a circumferential radial collar, which forms a stop for the carriage and which bounds a passage opening for a guide collar, which is formed onto the carriage and in which the control piston of the thermostat element is guided.

9. The thermostatic mixing valve according to claim 8, wherein the guide collar of the carriage is aligned with the coupling duct, whereby the coupling duct is prolonged.

10. The thermostatic mixing valve according to claim 8, wherein the bottom piece has on a bottom side of the bottom piece an annular sieve disk, through which the thermoelement protrudes.

11. The thermostatic mixing valve according to claim 10, wherein the first spring, via which the carriage is preloaded in the direction of the circumferential radial collar of the passage sleeve, is disposed between the annular sieve disk and the carriage.

12. The thermostatic mixing valve according to claim 7, wherein the bottom piece is equipped with a male thread, with which the bottom piece can be screwed into a female thread disposed in end position in the passage sleeve.

13. A thermostatic mixing valve for sanitary fittings, with a top piece, in which a cone is disposed to be axially movable via a rotatably mounted spindle, and a passage sleeve with windows for the supply of hot and cold water, in which a carriage preloaded via a first spring and joined to a thermoelement provided with a control piston is axially movable,
   wherein the supply of hot and cold water through the windows can be regulated in dependence on the movement of the carriage, wherein the cone comprises a bushing, which at an underside of the cone turned away from the rotatably mounted spindle is closed via a bottom and in which a conical piston is disposed to be axially movable and is preloaded via a second spring in the direction of the bottom,
   wherein a coupling duct is disposed in the bottom in axially aligned manner with the conical piston and which at the same time is axially aligned with the control piston of the thermoelement and into which the conical piston and/or the control piston of the thermoelement can be moved,
   wherein, in an upper hot-water position of the carriage, the control piston bears on the conical piston and the bottom is spaced apart from the carriage and, in a lower cold-water position of the carriage, the control piston is spaced apart from the conical piston and the bottom rests on the carriage,
   wherein the passage sleeve has, on an upper side of the passage sleeve turned toward the rotatably mounted spindle, a circumferential radial collar, which forms a stop for the carriage and which bounds a passage opening for a guide collar, which is formed onto the carriage and in which the control piston of the thermostat element is guided,
   wherein the passage sleeve has an axial collar, which is equipped with a male thread, and
   wherein an annular step encircling a passage opening is formed on concentrically with the axial collar, whereby an annular groove is bounded.

14. The thermostatic mixing valve according to claim 13, further comprising a circumferential ridge having an inside diameter corresponding to an outside diameter of the annular step of the passage sleeve, wherein the circumferential ridge can be introduced into the annular groove and is disposed on the bushing at a side of the bushing turned away from the rotatably mounted spindle.

15. The thermostatic mixing valve according to claim 13, wherein a radial sealing groove, which receives an O-ring, is made in the annular step.

16. A thermostatic mixing valve for sanitary fittings, with a top piece, in which a cone is disposed to be axially movable via a rotatably mounted spindle, and a passage sleeve with windows for the supply of hot and cold water, in which a carriage preloaded via a first spring and joined to a thermoelement provided with a control piston is axially movable,
   wherein the supply of hot and cold water through the windows can be regulated in dependence on the movement of the carriage,
   wherein the cone comprises a bushing, which at an underside of the cone turned away from the rotatably mounted spindle is closed via a bottom and in which a conical piston is disposed to be axially movable and is preloaded via a second spring in the direction of the bottom,
   wherein a coupling duct is disposed in the bottom in axially aligned manner with the conical piston and which at the same time is axially aligned with the control piston of the thermoelement and into which the conical piston and/or the control piston of the thermoelement can be moved,
   wherein, in an upper hot-water position of the carriage, the control piston bears on the conical piston and the bottom is spaced apart from the carriage and, in a lower cold-water position of the carriage, the control piston is spaced apart from the conical piston and the bottom rests on the carriage,
   wherein the passage sleeve is equipped with a bottom piece, which bounds a space in which the carriage joined to the thermoelement is disposed,
   wherein the bottom piece is equipped with a male thread, with which the bottom piece can be screwed into a female thread disposed in end position in the passage sleeve,
   wherein a circumferential ridge, which bounds the male thread and has a radial sealing groove that receives an O-ring, is disposed on the bottom piece, and wherein a braided screen-jacket is disposed between a circumferential ridge of the passage sleeve and the circumferential ridge of the bottom piece.

* * * * *